June 16, 1925.  1,542,059

F. A. KENNEY

SYSTEM OF AUTOMOBILE LIGHTING

Filed Jan. 19, 1924   2 Sheets-Sheet 1

Inventor
Frank A. Kenney.
By A. J. O'Brien
Attorney

June 16, 1925.                                                    1,542,059
F. A. KENNEY
SYSTEM OF AUTOMOBILE LIGHTING
Filed Jan. 19, 1924                  2 Sheets-Sheet 2

Inventor
Frank A. Kenney.
By A. J. O'Brien
Attorney

Patented June 16, 1925.

1,542,059

UNITED STATES PATENT OFFICE.

FRANK A. KENNEY, OF DENVER, COLORADO.

SYSTEM OF AUTOMOBILE LIGHTING.

Application filed January 19, 1924. Serial No. 687,217.

*To all whom it may concern:*

Be it known that I, FRANK A. KENNEY, a citizen of the United States, residing at Denver, county of Denver, and State of Colorado, have invented certain new and useful Improvements in Systems of Automobile Lighting; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in the illumination of automobiles.

In order to make night driving safe, it is necessary that the automobiles shall be provided with lamps that will properly illuminate the roadway in front of the machine. It is also imperative that the rays of light from the lamps shall not be projected into the air in sufficient volume to blind the driver of an approaching vehicle or to interfere with his vision. It is also highly desirable that the right side of the road shall be well illuminated, as this will obviate danger from driving off the road. In addition to the above, it is also necessary to have a light on the rear of the car, which shall preferably project red rays of light and serve to warn a driver that there is a car ahead that is traveling in the same direction.

It is the object of this invention to produce a pair of headlight lenses that shall be provided with means for directing the light onto the road in such a manner that the above results will be attained. The lenses, although each is a separate article, are so designed that they coact to produce the desired results, each modifying the illumination produced by the other. One of the lenses is also designed with the idea in view of obtaining a satisfactory illumination with only one lamp in operation.

In order better and more clearly to describe my invention, I shall have reference to the accompanying drawings in which the preferred embodiment thereof is shown, and in which.

The same reference characters will be used to designate the same parts throughout the several views.

The letters R and L represent respectively the right and the left headlight of an automobile. These headlights, aside from the lenses, may be of any ordinary construction, and comprise, in general, a casing 1, a reflector 2, and a lamp 3. The reflector may be the usual paraboloidal reflector which is extensively used and which projects a substantially cylindrical beam of light when the source of the illumination is a point located at the focus of the reflector. The lamp is scarcely ever located at the focal point of the reflector, but is usually located a short distance to the front, which causes the projected, reflected light to emerge in convergent lines.

My invention is embodied in the lenses, which are employed in connection with the reflector and the lamp. These lenses are so designed that they prevent the projected light rays from being thrown upwardly in sufficient quantity to interfere with the vision of an approaching driver. The lens for the righthand lamp is also provided with means for deflecting a part of the light rays towards the right of the road, so as to illuminate this side as well as any other portion of the road. The righthand lens will also direct a considerable proportion of the light towards the left so that fair illumination of the whole width of the road will be obtained with the righthand lamp alone.

Figure 1:
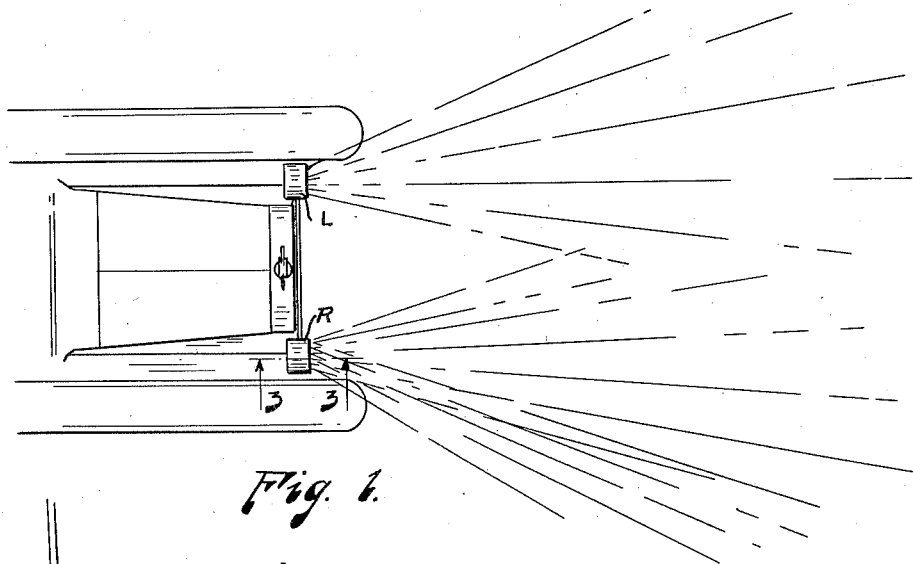
Fig. 1 is a top plan view of an automobile equipped with my improved lenses and shows the manner in which the light is distributed transversely of the road.
Figure 2:
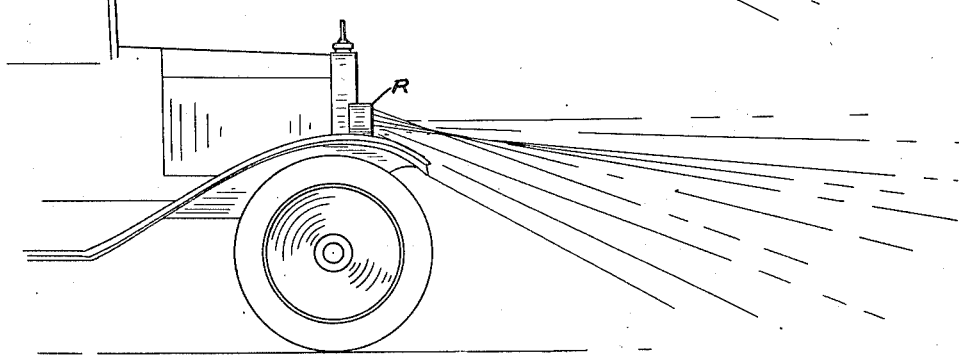
Fig. 2 is a side elevation of the automobile shown in Fig. 1 and shows the manner in which the light rays are distributed in a vertical plane.
Figure 3:
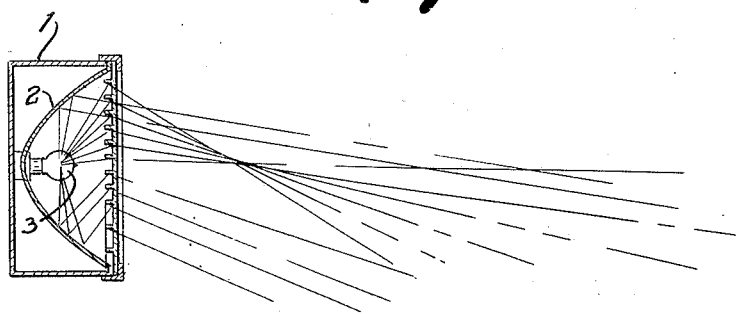
Fig. 3 is a vertical section through one of the lamps, taken substantially on line 3—3, Fig. 1.
Figures 4, 5:
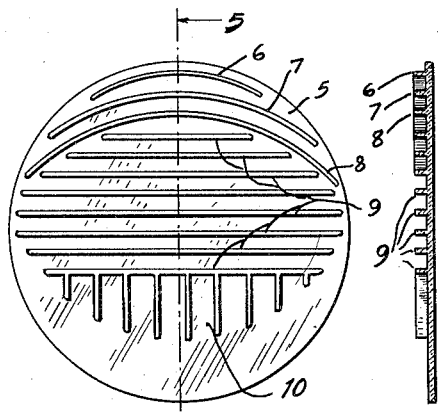
Fig. 4 is a view of the lefthand lens looking forwardly from the inside of the lamp.
Fig. 5 is a section taken on line 5—5, Fig. 4.
Figures 6, 7:
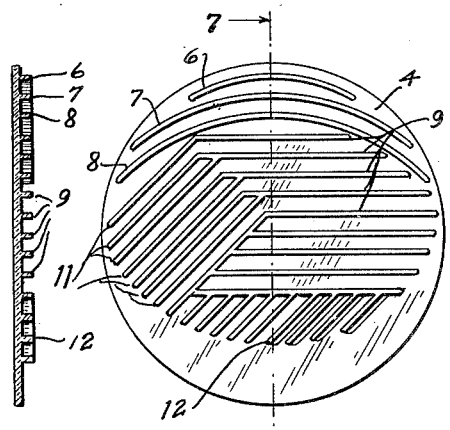
Fig. 6 is a view of the righthand lens looking forwardly from the inside of the car.
Fig. 7 is a section taken on line 7—7, Fig. 6.

In Figs. 4 and 6 I have shown the appearance of the side of the lenses nearest to the reflectors which may be referred to as the rear side of the lenses, and in Figs. 5 and 7 I have shown vertical sections. The lenses 4 and 6 have three rearwardly projecting arcuate ribs 6, 7 and 8, which extend rearwardly a distance of about one-half inch. Beneath the arcuate ribs are horizontal parallel ribs 9. In lens 4 the parallel ribs 9 extend substantially the entire width of the lens and below the lower horizontal rib are vertical ribs 10 which have very little effect on the distribution of the light, but do to some extent prevent rays from emerging in a sidewise direction. The ribs 6 to 9, except those below the center, are preferably silvered on their upper surface so that any light rays striking them from below will be reflected in the manner shown in Fig. 3. If we consider the light thrown off from the lamp 3, we will find that these rays, in leaving the lamp, will strike the lower side of the flanges so that like above the center and be reflected downwardly at the same angle. The light will impinge on the lower surface of the flanges at a greater degree when the flanges are near the center than when they are farther away, with the result that the light reflected from rib 6 will strike the road closer to the car than the light reflected from ribs lower down. The reflected rays will therefore cross in front of the lamp in the manner indicated in Fig. 3. Lens 4, which is employed in connection with the left lamp, prevents rays of light from being projected in an upward direction and such rays as leave the lamp or the reflector in an upward direction are reflected by the ribs and directed downwardly. Lens 6, which is designal especially for the righthand lamp, is constructed somewhat differently from lens 4. The horizontal ribs 9 do not extend the entire width of the lens but connect with a group of ribs 11 that are inclined at an angle of 45 degrees with the horizontal, and instead of the vertical group 10 of lens 4, a group 12 of oblique ribs 12 connect with the lower horizontal rib. The light from the lamp that strikes the ribs 11 will be reflected downwardly and to the right and serves to illuminate the right side of the road in the manner indicated in Fig. 1. The lower group of ribs 12 also assist to some extent in illuminating the righthand side of the road, as those ribs of the group that are located on the right of the center line are inclined to the plane of the lens sufficiently to prevent the light from being reflected to the left. It will be apparent from the above description that with a lens constructed like number 4, it will give a general illumination of the road and give a strong illumination of the right side of the road so that the righthand lamp can be used alone where for any reason it shall be found desirable to do so. The lefthand lens 4 distributes the light equally to both sides and keeps the rays from being thrown upwardly, as above explained. When both of the lamps are lighted, there will be an exceptionally brilliant illumination of the road, the right side of which will be well illuminated. The fact that only a very small proportion of the light is thrown upwardly, gives the driver a clearer vision of the road than he otherwise would have for the reason that he does not have to look through a thick layer of illuminated air, which has an obscuring effect.

Figure 8:
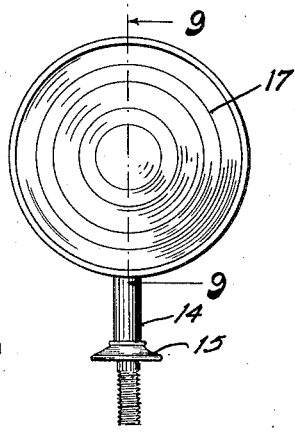
Fig. 8 is a view of a reflecting rear signal taken looking in the direction of arrow 8, in Fig. 9.
Figure 9:
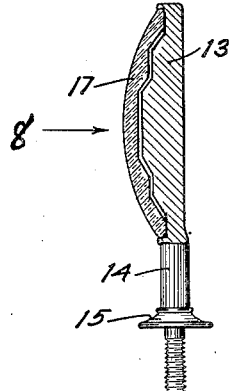
Fig. 9 is a section taken on line 9—9, Fig. 8.
Figure 10:
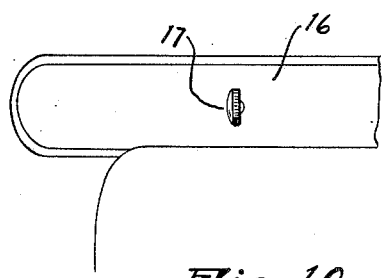
Fig. 10 is a plan view showing the signal in place on the left rear fender.

In order to warn a following car, I have produced the signal device illustrated in Figs. 8, 9 and 10, and which consists of a circular member 13, which has a supporting bracket or standard 14 secured to one side thereof. This standard has a flange 15 a short distance from the lower end, which is threaded. The signal device is intended to be secured to the rear lefthand fender 16 somewhat in the manner shown in Fig. 10. Secured to one side of the circular member 13 is a red glass lens 17 whose outer surface is convex and whose inner surface is concave. The inner surface has a circular flat portion 18 which is connected by an inclined annular portion 19 with the annular flat portion 20 that in turn is connected by an inclined annular portion 21 with the outer flat portion 22. The lens 17 is held onto the member 13 by means of a bead 23. The inner surface of the lens may be silvered so that any light that passes through the lens will be reflected. The annular inclined portions 19 and 21, which may have different angular inclinations with respect to the axis of the lens, causes light that comes from the side or which strikes the lens in a direction at an angle to the axis of the lens, to be partially reflected in the direction from which the light came.

If desired the inner surface of the lens may be left unsilvered and the opposing surface of member 13 shaped to conform to the inner surface of the lens and made reflecting so that any light that strikes the lens will pass through, strike the reflecting surface of member 13 and be reflected therefrom.

If an automobile properly equipped with headlights follows a vehicle having a signal light like the one described, some of the light will strike the lens 17 and be reflected, a portion striking the eyes of the driver. The reflected light, after having passed through the red lens, will of course be red and the effect will be the same as if the leading car had an ordinary red tail light which derives its light from an incandescent lamp. With the car equipped with the signal device described above, a warning signal will always be given to a following car. As this signal requires no lamp and depends on reflected light the signal is always operative.

Figure 11:
Fig. 11 is a modification of the construction shown in Fig. 9.

This signal may be used alone or in connection with the ordinary rear signal lamp, which derives its light from an incandescent, and may be constructed of a series of convex and concave reflecting surfaces as shown in Fig. 11.

From the above it will be apparent that I have produced a system of automobile illumination that will give good road illumination, will prevent upwardly directed rays in sufficient amount to interfere with the vision of the driver of an approaching machine and which increase the intensity of illumination on the righthand side of the road. These results are attained by the use of two specifically different lenses working together in the manner above described.

I want to call particular attention to the fact that my right lens is so constructed that it will give a good illumination of the road when the righthand lamp is used alone or in connection with a dim lefthand lamp. This permits the driver to dim or to darken the lamp nearest the approaching machine and at the same time to obtain a good light on the road.

Having now described my invention, what I claim as new is:

1. A system of road illumination for automobiles comprising two spaced headlights having reflectors, lamps and lenses, both of said lenses having means for deflecting upwardly inclined rays from the lamps downwardly upon the road and for permitting horizontal rays to pass through unaffected and the righthand lens having additional means for deflecting a portion of the rays downwardly and to the right.

2. A lens for use in connection with automobile headlights, comprising a circular body portion of flat, transparent glass, a plurality of spaced rearwardly projecting arcuate ribs on one side of said lens in the upper portion thereof, and a plurality of spaced rearwardly projecting straight horizontal ribs in the center portion of the lens said ribs being so located that they are bisected by a vertical line passing through the center of the body portion.

3. A lens for use in connection with automobile headlights, comprising a circular body portion of flat, transparent glass, a plurality of spaced rearwardly projecting arcuate ribs on one side of said lens in the upper portion thereof, a plurality of spaced rearwardly projecting straight horizontal ribs in the center portion of the lens said ribs being so located that they are bisected by a vertical line passing through the center of the body portion, and a plurality of straight, rearwardly projecting ribs extending downwardly from the horizontal ribs.

4. A lens for use in connection with automobile headlights comprising a body portion of flat transparent glass, one side of said glass being provided with integral ribs extending at right angles to the surface of the glass, the upper ribs being arcuate with their concave portion towards the center of the lens, the ribs below the arcuate ribs being straight, the upper surfaces of the ribs above the center of the lens being silvered.

5. A lens for use in connection with automobile headlights comprising a piece of flat transparent glass, one side of which is provided with a plurality of ribs projecting perpendicularly from the surface of the glass, a number of said ribs nearest the outer edge of the glass being arcuate, a plurality of straight ribs below said arcuate ribs, and a number of straight ribs making an angle of substantially 45 degrees with the first mentioned straight ribs.

6. A substantially circular lens for automobile headlights, formed from a piece of flat transparent glass, a number of arcuate ribs along one side of said lens, a number of straight spaced parallel ribs below said arcuate ribs one end of said parallel ribs connecting with ribs which extend at an angle of approximately 45 degrees with them, the upper surface of the ribs located above the center and the inclined ribs having their upper surfaces silvered.

In testimony whereof I affix my signature.

FRANK A. KENNEY.